(12) United States Patent
Lin et al.

(10) Patent No.: US 7,433,799 B2
(45) Date of Patent: Oct. 7, 2008

(54) METHOD OF DETERMINING SHAPE DATA

(75) Inventors: Wen-Jong Lin, Singapore (SG); Tsong Jye Ng, Singapore (SG); Xiao Qi Chen, Singapore (SG); Zhiming Gong, Singapore (SG)

(73) Assignee: Agency For Science, Technology and Research, Singapore (SG)

( * ) Notice: Subject to any disclaimer, the term of this patent is extended or adjusted under 35 U.S.C. 154(b) by 715 days.

(21) Appl. No.: 10/715,877

(22) Filed: Nov. 17, 2003

(65) Prior Publication Data

US 2005/0106998 A1    May 19, 2005

(51) Int. Cl.
*G01B 11/24*    (2006.01)
(52) U.S. Cl. ........................... 702/167; 702/168
(58) Field of Classification Search .......... 702/167–168
See application file for complete search history.

(56) References Cited

U.S. PATENT DOCUMENTS

| | | | |
|---|---|---|---|
| 4,051,636 A | 10/1977 | Heine | |
| 4,686,796 A | 8/1987 | Giebmanns | |
| 4,908,782 A | 3/1990 | Pekarek et al. | |
| 5,047,966 A | 9/1991 | Crow et al. | |
| 5,288,209 A * | 2/1994 | Therrien et al. | 416/193 R |
| 5,733,080 A | 3/1998 | David et al. | |
| 5,848,115 A | 12/1998 | Little et al. | |
| 5,913,555 A | 6/1999 | Richter et al. | |
| 6,100,893 A | 8/2000 | Ensz et al. | |
| 6,112,109 A | 8/2000 | D'Urso | |
| 2002/0091459 A1 | 7/2002 | Meier | |
| 2003/0167616 A1 | 9/2003 | Harding et al. | |

OTHER PUBLICATIONS

Singapore Search Report and Written Opinion, dated Apr. 24, 2007, for corresponding Singapore application SG200406186-7.
The Zenon Robot Grinding Cell for Turbine Blades Repair http://www.zenon.gr/GR/Robotics/R_Products/Robot_grinding.asp, Jun. 6, 2003.

* cited by examiner

*Primary Examiner*—Bryan Bui
*Assistant Examiner*—Jonathan Moffat
(74) *Attorney, Agent, or Firm*—Christie, Parker & Hale, LLP

(57) ABSTRACT

A method to determine the shape data of a complex curve surface using reference templates from a copy of the workpiece before it was used and the undamaged portion of the used workpiece so that the damaged portion of the workpiece can be reconstructed. The reference template is scanned in layers, including the portion corresponding to that which has been damaged in the workpiece, as well as adjacent undamaged portions of the used workpiece. Offsets of the reference template and workpiece are generated, based on corresponding portions of the reference template and the used workpiece. A new set of offsets of the damaged portion of the workpiece is then calculated. This calculated set of offsets is then used to calculate further profiles until a complete profile of the damaged portion has been predicted.

18 Claims, 9 Drawing Sheets

METHOD OF DETERMINING SHAPE DATA

FIELD OF THE INVENTION

The invention relates to a method of determining shape data, more particularly to a method for determining a surface of a workpiece having a complex curve surface, for surface finishing, and to individual methods used in getting to that.

BACKGROUND

The process of finishing a surface of a workpiece, such as for example a propeller blade, high pressure compressor turbine blade, and the like requires precision techniques to determine the desired contour of the surface of the workpiece. Such workpieces typically include synthetic or free form curves.

In the case of refurbishing used compressor or high-pressure turbine blades or vanes, used blades are typically already distorted and/or deformed through use due to wear and tear. Additionally, if the tip or leading or trailing edge of the turbine blade is worn or damaged, the worn or damaged portion is removed or cut out of the blade edge. Exotic material is welded on to the blade edge in place of the removed worn or damaged area. The surface of the welded area requires finishing to make the welded surface flush with the turbine blade surface. Finishing the surface, in particular the tips of the blade, is traditionally carried out by hand. Of course, the consistency of the quality of the hand finishing depends entirely on the degree of skill of the manual operator.

Attempts have been made to replace the manual operator with an automated system. However, as each used turbine blade develops a unique profile through use, which is different from the original profile of a new unused turbine blade as manufactured, methods are required to predict and generate the profiles of each used blade surface.

For example, U.S. Pat. No. 6,100,893, issued on 8 Aug. 2000 to Ensz et al., describes a process to reconstruct the profile of a workpiece by use of a computer for constructing geometric models of shapes. The representations of surfaces and solids corresponding to a collection of data points are produced by use of implicit functions based on a set of layer surface points of the object workpiece. The process of U.S. Pat. No. 6,100,893 however is unable to perform the profile reconstruction of on object where the original layer of the object cannot be measured, which is required in many applications such as for example refurbishment of turbine blades.

U.S. Pat. No. 4,686,796, issued on 18 Aug. 1987 to Giebmanns, describes a process and apparatus for polishing turbine blades to provide a circle segment approach to form complex curves. However, it does not include a practical implementation of a profile or reconstruction machining process.

Therefore, there is a need for a method of determining a surface of a workpiece to reconstruct the profile of a surface of a workpiece having synthetic or free form curves, such as for example the surface of a used turbine blade. Another need exists for a method to reconstruct the profile of a surface of a workpiece such as a used turbine blade even if the surface of the used workpiece is distorted and/or deformed with reference to an unused workpiece. There is another need for a method of determining a surface of a workpiece such that the profile of the workpiece that is generated may be used in the performance of the finishing processes by equipment such as a computer numerical control (CNC) machine, a robotic polishing/grinding system or the like. At the same time the method needs to achieve results that meet the strict requirements and maximum acceptable fault tolerance, whilst predicting the surface of a workpiece, for example a used turbine blade that may have been subjected to distortion and/or deformation.

SUMMARY

According to a first aspect of the invention, there is provided a method for determining shape data for a workpiece, the workpiece comprising at least a first portion and the shape data to be determined being for a second portion of the workpiece. The method includes providing shape data of the first portion of the workpiece, providing shape data of a reference template and determining the shape data of the second portion of the workpiece. The shape data of the template is of a first template portion and a second template portion of a reference template, the first template portion corresponding to the first portion of the workpiece, and the second template portion corresponding to the second portion of the workpiece, the second template portion having a shape related to the shape to be determined for the second portion of the workpiece. Determining the shape data of the second portion of the workpiece, is based on the shape data of the first template portion and the second template portion of the reference template and the shape data of the first portion of the workpiece.

According to a second aspect there is provided apparatus for carrying out a method similar to that of the first aspect.

According to a third aspect there is provided a computer program product for carrying out a method similar to that of the first aspect.

According to a fourth aspect, there is provided a workpiece repaired based on the complex curve determined according to the method of the first aspect.

According to a further aspect, there is provided a method of determining the head and tail points of a complex curve. The method comprises determining a second derivative curve for the complex curve and selecting the positions on the complex curve corresponding to the two lowest positions on the second derivative curve as the head and tail points of the complex curve.

According to another aspect, there is provided a method of determining a neutral line within a body, the body having first and second sides and first and second ends, the first and second sides extending from between the first and second ends of the body, the neutral line to extend between the first and second sides and from the first end to the second end. The method comprises providing a first series of points, providing a second series of points, determining midpoints and using the determined midpoints to derive the neutral line. The first series of points, is provided on a first line, on the first side of the body, from the first end to the second end, the first series containing a first number of points. The second series of points is provided on a second line, on the second side of the body, from the first end to the second end, the second series containing the first number of points, where the ratio of the distance between adjacent points in the second series to the length of the second line between the first and second ends is the same as the ratio of the distance between corresponding adjacent points in the first series to the length of the first line between the first and second ends. The midpoints are determined between corresponding points within the first and second series.

According to yet another aspect, there is provided a method of determining individual points along a neutral line within a body, the body having first and second sides and first and second ends, the first and second sides extending from between the first and second ends of the body, the neutral line to extend between the first and second sides and from the first end to the second end. The method comprises: (a) determining a first intersecting line; (b) determining a midpoint of the most recently determined intersecting line; (c) determining the midpoint to be a further point on the neutral line; (d) determining a temporary point; (e) determining a second intersecting line; and (f) reverting to (b). The first intersecting line intersects the first and second sides at first and second intersection points. The midpoint of the most recently determined intersecting line is mid-way between the most recently determined intersection points. The temporary point is at the end of a vector extending from the further point on the neutral line, in a direction which is an average of the direction of the first and second sides at the most recently determined intersection points, for a first predetermined distance. The second intersecting line intersects the first and second sides at third and fourth intersection points, the second intersecting line passing through the first temporary point perpendicular to the first vector.

BRIEF DESCRIPTION OF THE DRAWINGS

These and other features, objects, and advantages of embodiments of the invention will be better understood and readily apparent to one of ordinary skill in the art from the following description of a non-limiting example, in conjunction with the drawings, in which.

DETAILED DESCRIPTION

In non-limiting summary of an embodiment of the invention, a reference template is used to help in the reconstruction of a damaged workpiece, such as a turbine blade. The reference template is a copy of the workpiece from before it was used. The reference template is scanned in layers, including the portion corresponding to that which has been damaged in the workpiece, as well as adjacent undamaged portions. The adjacent undamaged portions of the workpiece are also scanned as layers. Profiles of the layers of the reference template and workpiece are generated, based on the scans. Sets of offsets are then determined based on corresponding points within adjacent scanned layers in the undamaged portion of the workpiece and the corresponding portion of the reference template and also within the portion of the reference template corresponding to the damaged portion of the workpiece. A new set of offsets is then calculated between the undamaged and damaged portions of the workpiece, based on these various sets of offsets, to predict a neutral line of a layer of the damaged portion. This predicted neutral line is then used to extrapolate to a surface profile of the damaged portion. Calculated sets of offsets can be used to calculate further profiles until a complete profile of the damaged portion has been predicted.

The determination of the complex curve making up the profile of a workpiece to be determined, involves three main steps:

1. scanning of (portions of) a reference template and generation of neutral lines and profile data—this is to determine how the different layers of a template relate to each other;
2. scanning of undamaged portions of the workpiece to be repaired and generation of neutral line and profile data;
3. calculation of the profile of the portion of the workpiece to be reconstructed.

Step 1 does not have to take place each time a component is to be repaired. It can take place earlier, with the information held in memory, such as in a library.

The finishing of a surface of a workpiece, such as for example a propeller blade, high pressure compressor turbine blade or vane and the like, by automated systems such as a computer numerical control (CNC) machine or robotic polishing/grinding systems, requires precision techniques to determine the desired contour of the surface of the workpiece. A method for determining the surface of a workpiece is discussed herein. For illustrative purposes, the application of an embodiment of the method is discussed with respect to high-pressure turbine (HPT) blades. It will be appreciated that embodiments of the method may be equally applied to other workpieces.

Figures 1A, 1B, 1C:
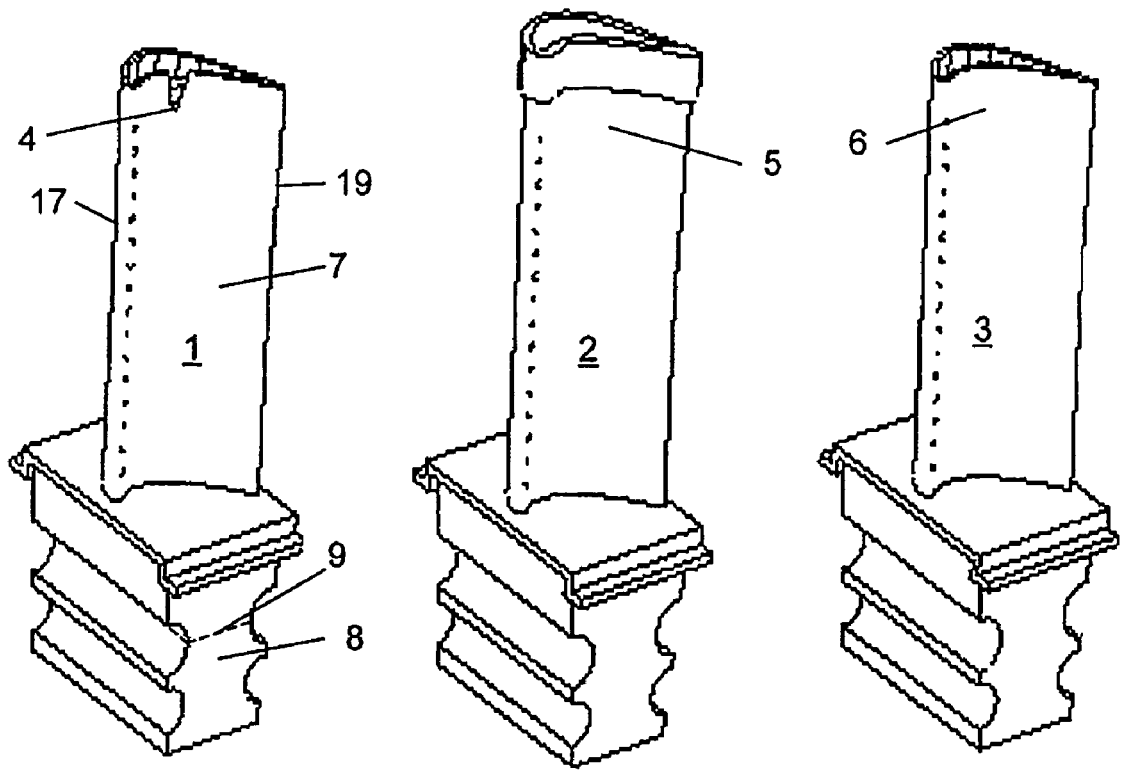
FIGS. 1A-C are perspective views of stages in the refurbishment of a workpiece in accordance with an embodiment of the invention.

FIGS. 1A-C are perspective views of a workpiece, for example a turbine blade as shown, during the different stages of refurbishment according to an embodiment of the invention. FIG. 1A shows a used turbine blade 1 that is damaged at the tip shown by damaged section 4. Also, a non-damaged section 7 is shown, however, even the non-damaged section 7 may be distorted, for example twisted or bent, or deformed, for example elongated or compressed, in comparison to a new unused turbine blade. Also shown in FIG. 1A is the head 17 and tail 19 of the turbine blade, and a reference point 9 from which are determined the distances to the horizontal layers of a cross-section of the workpiece along a plane that intersects along a point on the vertical axis (Z). The reference point is chosen to be easily cross-referenced to both a new and a used turbine blade. In this embodiment, the reference point 9 shown in FIG. 1A is mid-way up the upper slot that is used to mount the turbine blade, since this is what defines the length of the turbine blade in use. FIG. 1B shows the welded turbine blade 2 during refurbishing, after the damaged or worn-out section has been cut out and replaced with a weld area 5. FIG. 1C shows a refurbished used turbine blade 3 with a finished surface 6.

Figure 2:
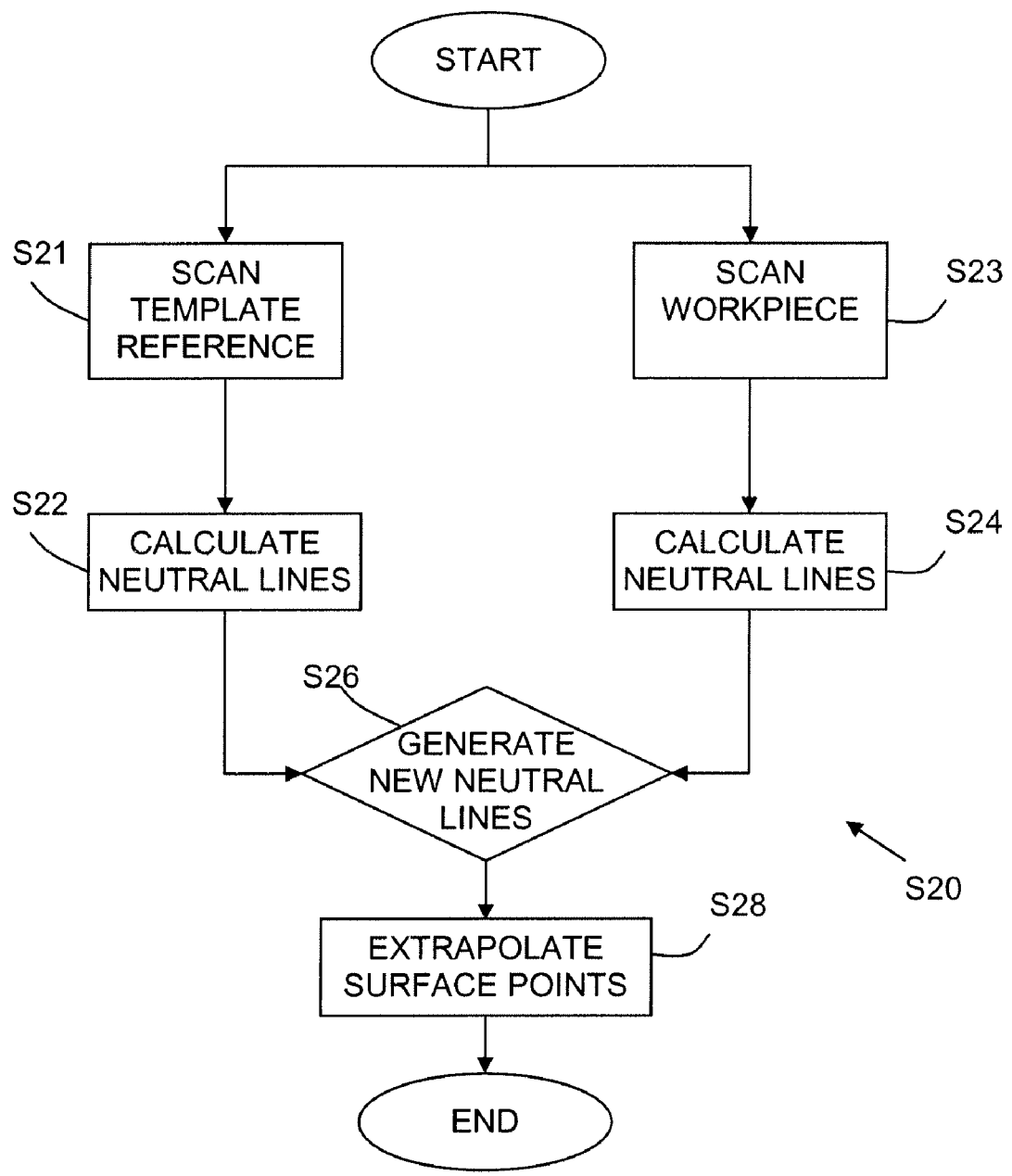
FIG. 2 shows a flow chart of a method in accordance with an embodiment of the invention.

FIG. 2 is a flowchart showing an overview of the whole process S20 for determining the outer profile for a blade to be repaired. As shown in FIG. 2, layers of an undamaged template blade (preferably unused) and undamaged layers of a used turbine blade are scanned (steps S21 and S23, respectively). The scanned layers of the template should include those layers corresponding to the damaged area of the used blade and the undamaged layers immediately below the damaged area. Neutral lines are calculated for scanned layers of the template turbine blade and the used turbine blade (steps S22 and S24, respectively). Using these calculated neutral lines, new neutral lines, for layers in the damaged area of the used turbine blade are generated (step S26). The damaged area of the used turbine blade may not even exist as it has been broken off or cut from the undamaged area, but this is a virtual area, being an area that is to be rebuilt. In this embodiment, correspondence of layers is defined and referenced against the agreed reference point 9, based on corresponding layers being the same distance in the z direction above the agreed reference point 9. The surface profile of the damaged section of the used turbine blade is then determined, as described below, by an extrapolation (step S28) using data on the used turbine blade.

Scanning

Figure 3:
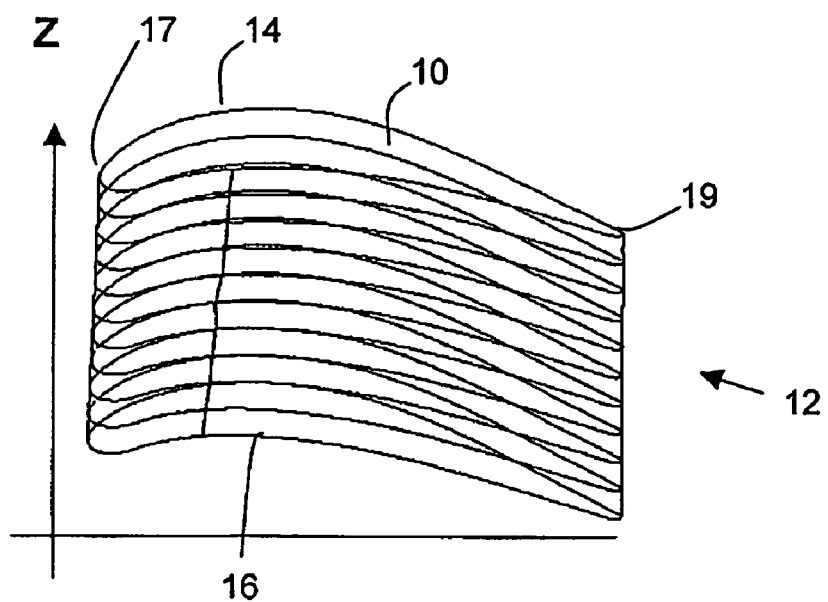
FIG. 3 shows profile data of a surface of a workpiece in accordance with an embodiment of the invention.

FIG. 3 shows profile data 12 of a new unused turbine blade, which is to be used as a reference template. Each layer 10 is defined as a horizontal plane that intersects the blade at a point on the vertical axis (Z). Each section is identified based on the value of Z that is determined from a reference point 9 shown in FIG. 1A. Although FIG. 1A shows a used turbine blade, the reference point on the new unused blade is the corresponding point. The digitized profile data 12 of an unused blade is produced with well known scanning techniques such as touch or non-touch measurement devices, for example coordinate measuring machines (CMM) or digitizing/scanning machine. However, since these scanning techniques may not provide adequate or uniform data sequences, further filtering and point selection may be required.

One way to improve efficiency is to reduce the cycle time, including reducing the time taken in the scanning process. In a time optimized process, the aim is to obtain the blade profile with minimum numbers of points. In a scanning process used in an embodiment of the invention, the profile is required to be defined by N points or fewer per layer, with a preset tolerance.

Figure 4:
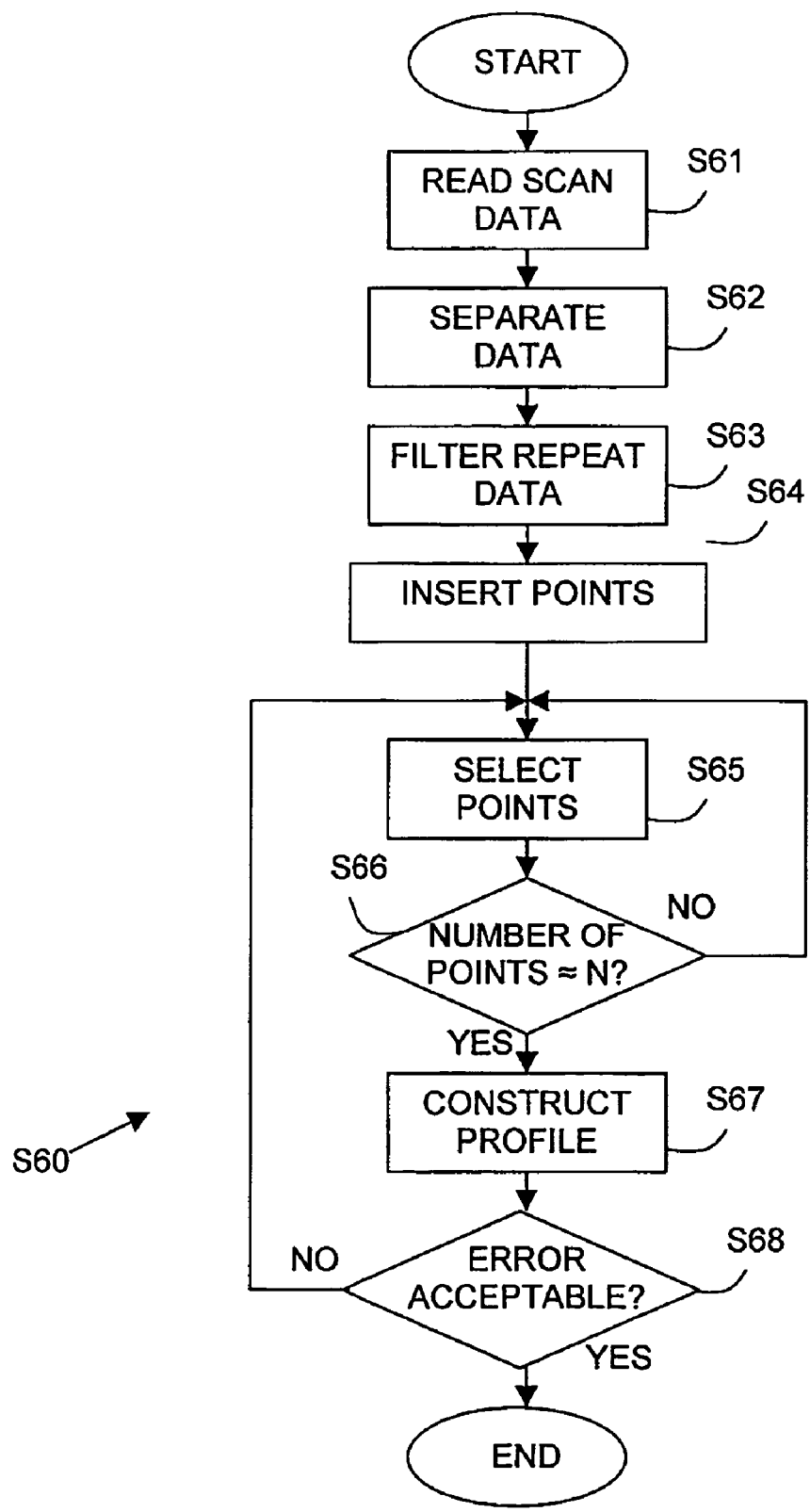
FIG. 4 shows a flow chart of a collecting desired points in a scanning process in accordance with an embodiment of the invention.

An optimized scanning process S60 for one embodiment is performed in accordance with the flow chart of an embodiment of the invention as shown in FIG. 4. For each layer, that is at each of a number of positions along the Z axis of the blade the blade's profile is scanned. The number of points scanned depends on the blade size and the level of accuracy required. For a low level, 50 or so points per layer may be sufficient for a blade of around 50 mm. However, 200 or more points per layer are normally required.

Figure 5:
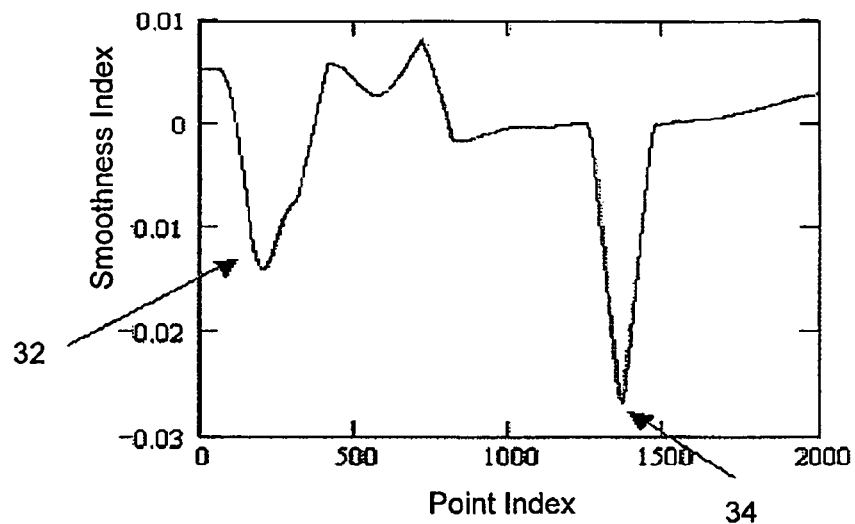
FIG. 5 shows a graph of the $2^{nd}$ derivative diagram of a surface profile of a workpiece in accordance with an embodiment of the invention.

The scan data of each turbine blade layer profile is read (step S61) and processed, by way of separation (step S62), filtering (step S63), and the insertion of additional points (step S64). In separation, points on the profile are separated into two portions based on sections of the surface of the workpiece. That is, points lying on the convex or pressure side 14 of the turbine blade are separated from points lying on the concave or suction side 16 of the turbine blade. To determine the sections according to one aspect of the invention, the head 17 and tail 19 of the turbine blade may be identified by the two lowest peaks 32, 34 of the $2^{nd}$ derivative diagram curve 30 of the scanned body, as shown in FIG. 5. In FIG. 5 the X-axis represents the point index, which is the number of each point on the same layer, in sequence, around the shape of the workpiece, and the Y-axis represents the smoothness index, which is the second derivative value of each point after curve smooth fitting. The head of the blade is identified by low peak 32 and the tail of the blade is identified by low peak 34. Moreover, filtering involves removing all repeated points from each portion. This is necessary since some scanning algorithms may scan the same point more than once. Finally, interpolation may be used to derive and insert further points into the gaps.

In scanning techniques such as CMM scanning, for example, the scan provides points that may not be distributed uniformly on the turbine blade contour. More points tend to be located at the more rounded sections such as the head portion of the turbine blade, and fewer points tend to be located at the more linear section of the tail section of the turbine blade. It may therefore be useful to insert some points based on interpolation of the scanned points. Points may be selected, in particular along the rounded sections, to form the profile data 12 based on a minimum distance. However, that may not achieve the best results, as some parts of a profile need more points to interpolate than others. Various curve fitting methods may be used. The preferred one used in this embodiment is the Catmull-Rom interpolation mentioned later. For example, this may increase the number of points from around 200 to around 1000, some parts of the curve attracting more of these added points than others.

In order to obtain sensibly distributed and positioned points, a number of techniques may be employed, including Hermite Cubic spline curve, Bezier curve, B-spline curve, Catmull-Rom spline curve, and the like. The Catmull-Rom spline curve is preferred as a robust curve fitting spline curve that passes through all of the control points, unlike other spline curves.

A parametric cubic spline is defined as, $$P(t) = \sum_{i=0}^{3} a_i t^i \quad 0 \leq t \leq 1$$

where P(t) is a point on the curve, t is the parameter and $a_i$ are the polynomial coefficients. To calculate a point on the curve, two points on either side of the desired point are required. The point is specified by a value t that signifies the portion of the distance between the two nearest control points. Given the control points $P_0$, $P_1$, $P_2$, and $P_3$, and the value t, the location of the point can be calculated as (assuming uniform spacing of control points):

$$P(t) = 0.5 * [1 \quad t \quad t^2 \quad t^3] * \begin{bmatrix} 0 & 2 & 0 & 0 \\ -1 & 0 & 1 & 0 \\ 2 & -5 & 4 & -1 \\ -1 & 3 & -3 & 1 \end{bmatrix} * \begin{bmatrix} P0 \\ P1 \\ P2 \\ P3 \end{bmatrix}$$

which may also be expressed as:

$$P(t)=0.5*[(2*P1)+(-P0+P2)*t+(2*P0-5*P1+4*P2-P3)*t^2+(-P0+3*P1-3*P2-P3)*t^3]$$

Several characteristics can be obtained from the above formula. Catmull-Rom passes through all the control points, unlike Bezier or B-Spline that only passes through the first and the last control points. First order of continuity is ensured, meaning that there are no discontinuities in the tangent direction and magnitude. However, the second order of continuity is not guaranteed, the second derivative is linearly interpolated with each segment. This causes the curvature to vary linearly over the length of the segment. Some points on the segment may lie outside of the domain of P1=>P2. While a spline segment is defined using four control points, a spline may have any number of additional control points. This results in a continuous chain of segments, each defined by the two control points that form the endpoints of the segments, plus an additional control point on either side of the endpoints. Thus for a given segment with endpoints $P_n$ and $P_{n+1}$, the segment would be calculated using $[P_{n-1}, P_n, P_{n+1}, P_{n+2}]$. Since a segment requires control points to the outside of the segment endpoints, the segments at the extreme ends of the spline cannot be calculated. For a spline with control points 1 through N, the minimum segment that can be formulated is $P_1 <\text{->} P_2$, and the maximum segment is $P_{N-3} <\text{->} P_{N-2}$. Thus, to define S segments, S+3 control points are required.

A set of points is then selected (step S65) from all the way around the profile, one set being equally spaced around the concave surface and the other being equally spaced around the convex surface. For each surface this is achieved by summing the distances between the head of the blade profile and the tail of the blade profile and dividing each total by a desired number of points N/2, for example 100, to produce an average point spacing for that surface. On each surface a first point is selected, for one side this is the head point and for the other it is the tail point); a second point is selected which is closest to the average point spacing for that surface, away from the first point; a third point is selected which is closest to the average point spacing for that surface, away from the second point, and so on, until the selection has gone from the head to the tail (or vice versa as appropriate). If the actual total number of points selected is not roughly equal to N (step S66), then the set of points is selected again (initially swapping the first point round for the two surfaces, then trying other changes if that does not work, such as alternating between taking the closest point after the average point spacing with taking the closest point before the average point spacing, rather than just the point closest to it) until an acceptable number of points has been selected.

After the number of selected points is acceptable, the profile is constructed (step S67) based on the selected points. For each selected point the process determines an error and whether the error is acceptable (step S68), within a preset value, such as 30 micrometers. The error for a selected point is determined by finding its nearest point on the original scanned contour. Two lines are formed between that nearest point and the points next to it on the left and right sides, on the original scanned contour. The error is the shortest distance between the selected point and either of these two lines. If the error for every point is less than the preset value, then the optimized scanning is complete. Otherwise, the process reverts to step S65 and another set of points is selected and the steps S65 to S68 are repeated as shown until the error is acceptable. It may be that the error is never acceptable, according to step S68. If that is the case, it means that N is too small and needs to be larger. However, it is better to keep N small, if possible, to reduce the processing power needed for later steps.

N is also controlled to ensure that it provides results that fall within an acceptable error when the resulting selected points are used to predict a surface of the workpiece in a manner as is described below. Whether there is an acceptable error is determined by predicting the shape of a portion of the workpiece that has not been damaged, and therefore that can be scanned, and then comparing the predicted results with the actual profile.

Various of the steps of the process may be rearranged, in particular the separation (step S62), filtering (step S63), insertion (step S64) or the like, and the repeating of the calculation for reselecting points or achieving acceptable error may also include any of the separate, filter, insertion, or the like steps.

The number of points selected and used in the data profile is minimized. Even 50 input points, selected in the above manner, can form an adequate turbine blade layer surface profile with a fault tolerance within approximately 30 micrometers. The scan of the new unused turbine blade is repeated several times, at different values along the Z axis along the length of the turbine blade to produce the complete profile data 12. The scan is repeated for those layers that correspond to the damaged layers of a used blade, and two layers below or, where the template scans are being generated for a library or storage, for those layers which represent the maximum extent of damage for which repairs would still be made, and two layers below. Once the profile data 12 of a new turbine blade has been generated, a neutral line is calculated for each layer, the profile data and neutral line data are all shape data.

Generating the Neutral Line

Figure 6:
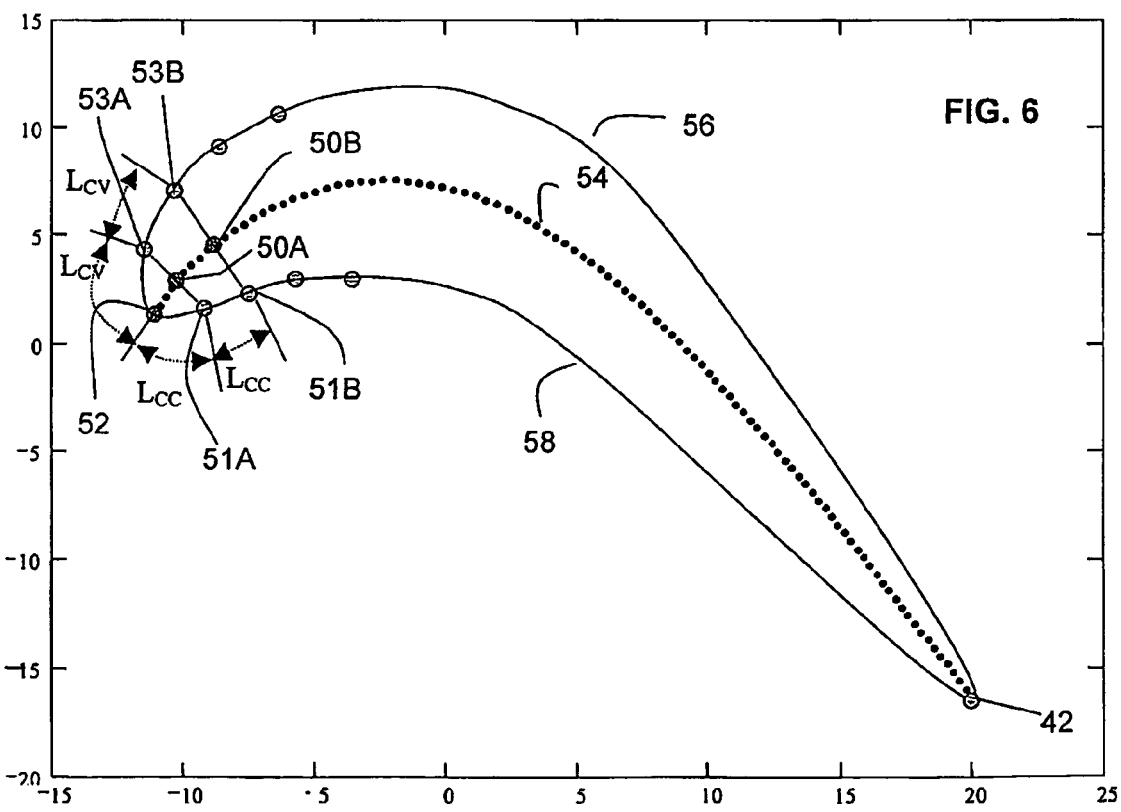
FIG. 6 shows a graph of the $1^{st}$ derivative diagram of a surface profile of the workpiece with head and tail points and a neutral line determined in accordance with an embodiment of the invention.
Figure 7:
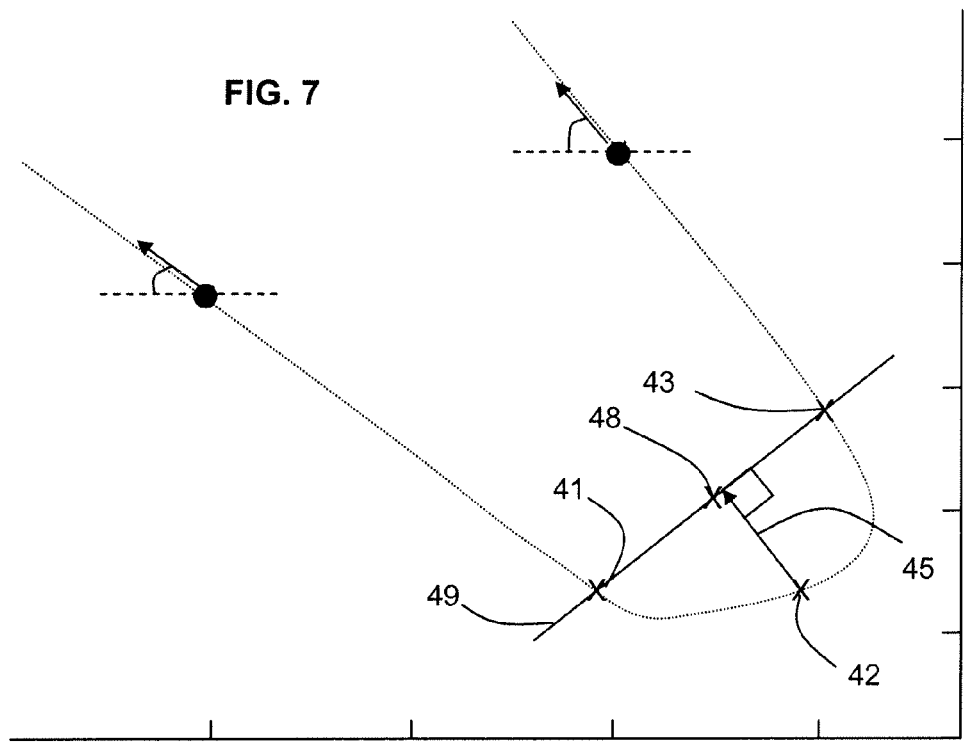
FIG. 7 shows a graph of the computation of the neutral line in accordance with another embodiment of the invention.

The neutral line is a line joining a set of points which are spaced at an equal distance from the generated data profiles of the points on the convex and concave sides of the profile, as shown in FIG. 6 and FIG. 7. The neutral line is calculated for each layer of the profile data 12. The neutral line may be considered as a "backbone" of the contour of the turbine blade. Prior to calculating the neutral line for this embodiment, points may be inserted into the scan data, and the head point and tail point of the contour need to be found, as discussed above.

A method of obtaining the neutral line according to one embodiment of the invention is now described, with reference to FIG. 7, based on a scanned profile and knowledge of where the head and tail points are, for instance as determined according to the method mentioned in connection with FIG. 5. The convex and concave sides 56, 58 are divided into a number of equally spaced points, as may be derived from the above described process with reference to FIG. 4. Those points 53A, 53B, . . . on the convex side each are each spaced a length Lcv, whilst those points 51A, 51B, . . . on the concave side are each spaced a length Lcc, where Lcv and Lcc are not equal to each other (for an aerofoil shaped blade). Starting from the head, lines are drawn linking each pair of opposing points, that is the first point 51A of the concave side with the first point 53A on the convex side, and the second point 51B of the concave side with the second point 53B on the convex side. The midpoint 50A, 50B, . . . of each such line is recorded as an element of the neutral line. This is continuously repeated to calculate the preliminary neutral line 54 until it extends from the head 52 to the tail 42 (or it could be done the other way around). The neutral line therefore has the same number of points as there are points per side between the two ends, plus the two ends.

In the above embodiment, the on points each side are equally spaced. In a further embodiment, they are not equally spaced, but the distances between corresponding pairs of points on the two sides are the same ratio of the overall lengths of the sides. Thus the ratio of the length between the $j^{th}$ and $j+1^{th}$ points on one side to the overall length of that side, is the same as the ratio of the length between the $j^{th}$ and $j+1^{th}$ points on the other side to the overall length of that other side.

An alternative embodiment for calculating the neutral line begins with the point of the tail 42 as shown in FIG. 5 as the first point, and again with a blade profile that has the same number of points per surface between the tail and the tip, the points being equi-spaced along each side (but differing in spacing between the two sides). The points in the neutral line are obtained using a series of point vectors, each of a same preset magnitude, in this case 1.3 mm, and each extending from the previous point in the neutral line in a direction that is the average direction of the profile at two selected points on the profile, one on each. A line is determined perpendicular to and running through the end of the point vector. Where this crosses the profile is determined as the next two selected points, and the next point on the neutral line is mid-way between those two new selected points.

The first point in the neutral line is the tail point 42. This is because it is easier to identify more accurately than the head point, as is clear from the graph of FIG. 3. For determining the second point in this embodiment, the first selected points are the $30^{th}$ point on both sides of the tail 42. The direction of the profile at these first selected points, in this instance, is the average of the sum of the directions for each pair of points up to the $30^{th}$ point, that is the sum of: the angle from the $1^{st}$ point to the $2^{nd}$ point, plus the angle from the $2^{nd}$ point to the $3^{rd}$ point, ..., plus the angle from the $29^{th}$ point to the $30^{th}$ point, divided by 29, on each side. Once the two averages, one on each side, are determined, the two average directions are added together, to produce the direction of the first point vector 45 from the first point on the neutral line, the tail point.

The end point of the first point vector 45 is a first temporary point. A first perpendicular line perpendicular to the first point vector 45 and passing through the first temporary point at the end of the vector 45 is calculated. This first perpendicular line cuts through both sides of the profile at two second selected points, one intersection point 41 along the concave (suction) side and another intersection point 43 along the convex (pressure) side. A midpoint 48 between the two intersection points 41,43 is recorded as the second point of the neutral line.

The third neutral line point is obtained in a similar manner, by a second point vector with the same preset magnitude, starting from the second point, and a direction which is the average of the direction of the profile at the two previous, selected points, intersection points 41, 43. The direction of the profile at an intersection point is the direction the profile takes between the nearest point on the profile preceding the intersection point (that is nearer the tail) and the nearest point on the profile succeeding the intersection point (that is nearer the tip). The end point of the second point vector is a second temporary point. As with the first temporary point, a second perpendicular line perpendicular to the second point vector and passing through the second temporary point is calculated. This second perpendicular line cuts through both sides of the profile at two new, third selected point intersection points. The mid-point between the two third point intersection points then becomes the third point of the neutral line. The fourth point of the neutral line is then calculated starting from the third point and the two third point intersection points, in a direction which is the average of the directions of the profile at the two third selected point intersection points. The remaining points of the neutral line are then calculated in a similar manner.

The $30^{th}$ points are chosen to find the second point in the neutral line because the points immediately proximate the tail are not linear, and in a blade profile with 100 points per surface, it is only near the $30^{th}$ point that the characteristic linearity of the tail portion is seen. The choice of initial points therefore clearly varies according to the size and shape of the surface.

The preset magnitude is determined through a recursive search to find the best fit that is able to link both head and tail of the neutral-line, given that the positions of both are known (or at least that of the head point is known to some degree of accuracy. Thus if the above process leads to the end of the neutral line being too far from the known head point position, given the known degree of accuracy for that position, the preset magnitude is reset, and the process of determining the neutral line begins again. The 1.3 mm vector magnitude in this particular case was obtained through experiment, within two boundaries of 0.5 mm and 2 mm, but it may vary with the type of workpiece and the workpiece profile.

Other methods that can establish the neutral line, whether mathematically or through experiment or through a mixture, can be used as well or instead within different aspects of the invention.

The preliminary neutral line may be modified. For example, additional points may be inserted along the preliminary neutral line. Points may be inserted at the mid-point of straight lines connecting each element of the preliminary neutral line. Thus, in this embodiment, for example of 50 elements of the preliminary neutral line, additional points may be added to make 101 elements of the uniform interval/gap modified neutral line. The neutral line of a single layer profile of the unused turbine blade is therefore obtained.

After the neutral lines are calculated for the template or reference (and possibly unused) turbine blade, neutral lines are likewise calculated for the used turbine blade in the same manner as above. Of course it will be appreciated that the shape data, that is the scan data, neutral line, and profile data of the reference turbine blade may be stored and used as a template repetitively for different used turbine blade refurbishments. The used turbine blade may be scanned to form a single layer of profile data, or any number of layers. In this embodiment, at least three layers are recorded at the top portion of the turbine blade that is not damaged, using the measurement device equipment such as the CMM as described above. The neutral line for each of the two layer profiles of the used turbine blade are preferably calculated in the same manner as described for the unused turbine blade data profile.

Calculation of the Profile

Due to stresses and strains and wear and tear, turbine blades and other blades and workpieces become distorted in use, particularly at their tips. The changed profile or contour of the tip must also compensated for in the finishing of the surfaces of refurbished workpieces.

Figure 8A:
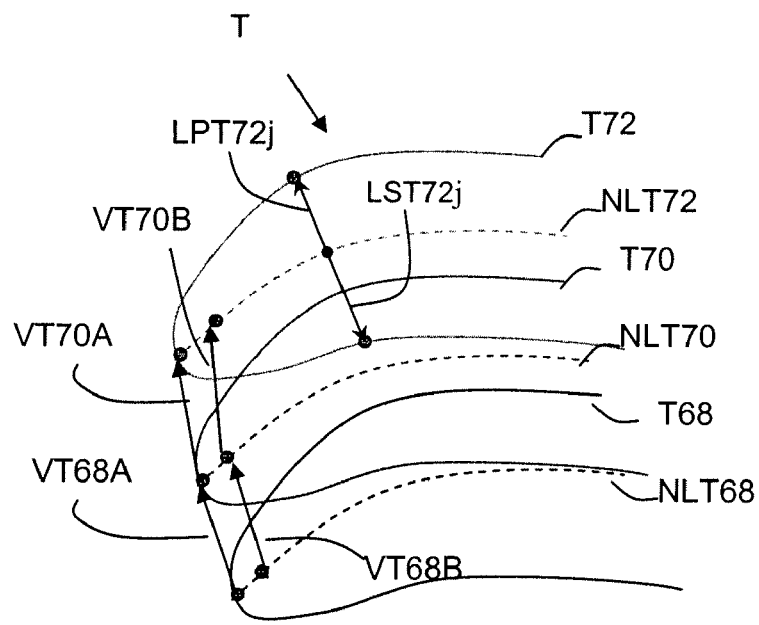
FIGS. 8A and 8B show layers and vectors associated with interpolation to determine the neutral line and the workpiece profile in accordance with an embodiment of the invention.
Figure 8B:
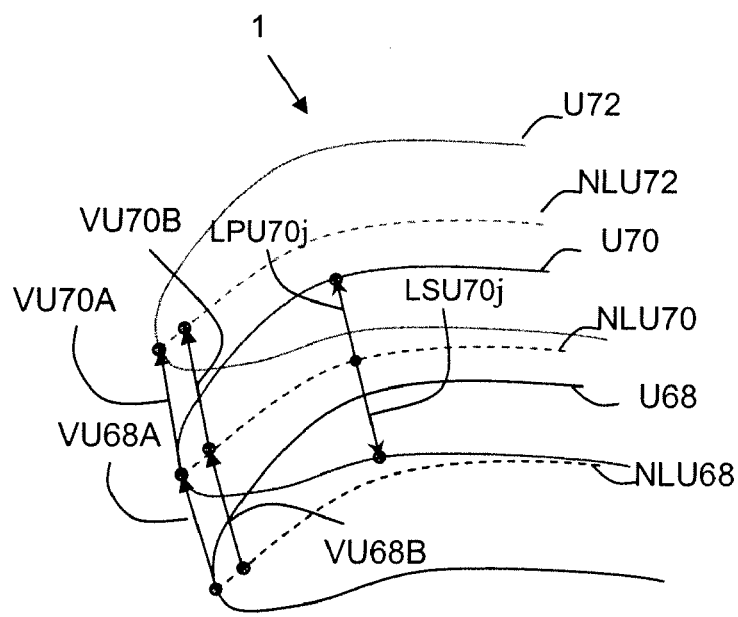

The method of determining the surface profile of the damaged portion of the used workpiece is discussed below with reference to FIGS. 8A and 8B and FIG. 10. FIG. 8A shows three layers T68, T70, T72 of a reference, template blade T, whilst FIG. 8B shows the corresponding layers U68, U70, U72 of the used blade 1 (See FIG. 1A) (based on the level above the reference position 9). In this embodiment the numbers 66, 68, 70 etc., refer to the height of the layer above the reference point, the scans being taken 2 mm apart. However, that does vary from case to case. The two lower layers U68, U70 of the used workpiece are those that are scanned, whilst the top layer U72 is extrapolated from the two lower layers U68, U70, using the data on the three layers T68, T70, T72 of the template.

Figure 10:
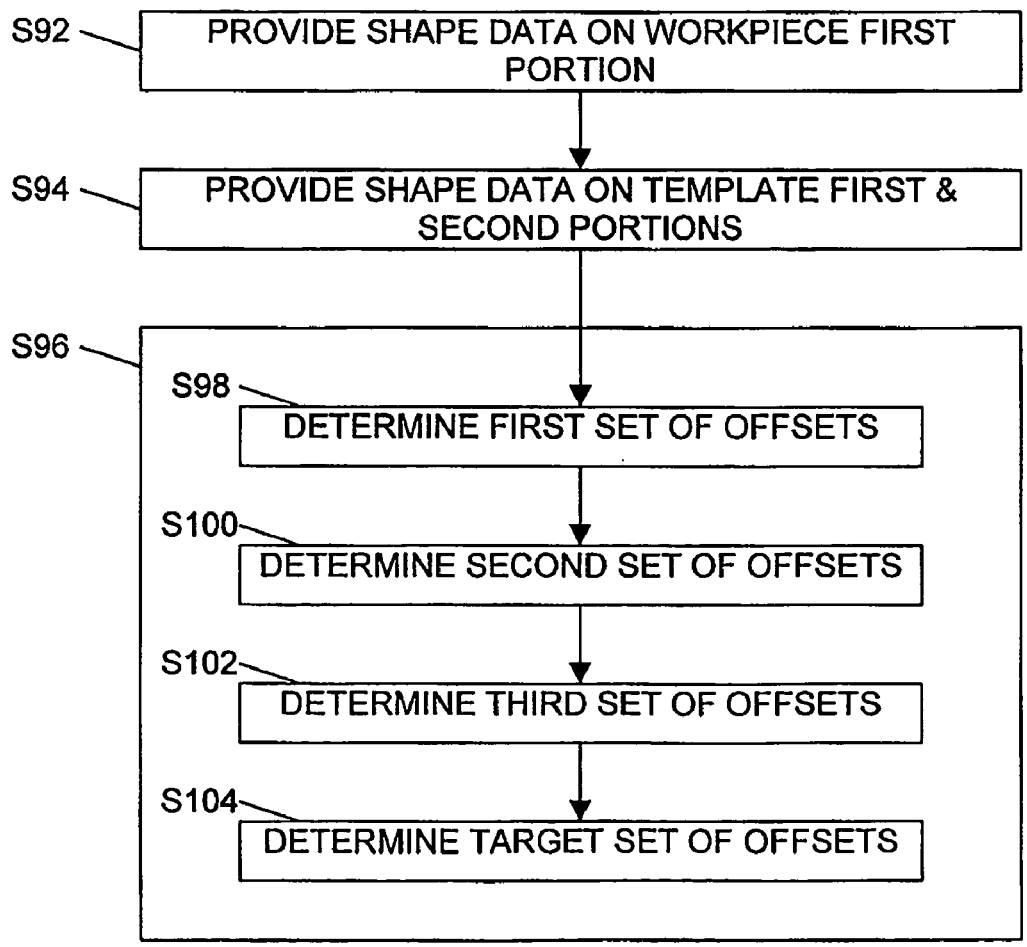
FIG. 10 shows a flow chart of another method in accordance with an embodiment of the invention.

FIG. 10 is a short flowchart explaining the method of determining the surface profile. The layers of the used workpiece that can be scanned U68, U70 form a first portion of that workpiece and shape data on the first portion is provided (step S92). The layers of the used workpiece that are damaged or missing and cannot usefully be scanned, U72 (and above), form a second portion of that workpiece. The corresponding layers of the template likewise form a first portion T68, T70, and a second portion T72 (and above), even though all of the layers of the template can be scanned. Shape data on the first and second portions of the template is provided (step S94). Shape data of the second portion of the used workpiece is then determined, based on the provided shape data of the first portion of the workpiece and the provided shape data of the first and second portions of the template (step S96).

Within step S96, a target set of offsets is determined to add to the shape data of the first portion of the workpiece.

More particularly, a first set of offsets is determined between the first and second portions of the template (between layers T70 and T72) (step S98), a second set of offsets is determined within the first portion of the template (between layers T68 and T70) (step S100) and a third set of offsets is determined within the first portion of the workpiece (between layers U68 and U70) (step S102). The first, second and third sets of offsets are used to determine the target, fourth set of offsets (step S104). This fourth set of offsets is used with data on the first portion of the used workpiece to extrapolate shape data for the second portion of the used workpiece, leading to determination of the surface shape data for the second portion of the used workpiece.

If there are then further layers of the used workpiece whose shape needs to be determined, the layer whose shape has been extrapolated becomes part of the first portion of the used workpiece (and its corresponding layer in the template becomes part of the first portion of the template) and the process goes on again from there.

For successive layers in the template, an offset or offset vector can be calculated which describes the change from one point in the layer to a corresponding point on the next layer. In particular, each of the layers T68, T70, T72 of the template has a neutral line NLT68, NLT70, NLT72, each of 100 points. For this purpose, the neutral lines of all the scanned layers that are used should preferably have been obtained by the same approach and with the same number of points. The offset vectors can be calculated for each of the 100 points along the neutral lines. A first vector VT68A describes the change in the first point along the neutral lines between the lower two layers T68, T70 of the template. A second vector VT68B describes the change in the second point along the neutral lines between the lower two layers T68, T70 of the template, and so on. Likewise a second set of vectors VT70 (VT70A, VT70B . . . ) describes the changes in the various points along the neutral lines between the second and third layers T70, T72 of the template.

In a similar manner it is also possible to derive a set of vectors VU68 (VU68A, VU68B, . . . ) between points along the neutral lines NLU68, NLU70 of the lower two layers U68, U70 of the used workpiece. However, it is not initially possible to derive one above the second layer U70, as the layers above that are damaged.

Because the layers are all the same distance apart in the z direction (in this instance 2 mm), it is not necessary to determine the vector are such. Instead, the offsets this embodiment uses are angles from one point on a neutral line to the corresponding point on the next neutral line. The angle between corresponding points in successive neutral lines is a result of a linear distortion tendency across the layers and a specific distortion between two layers. The changes in the angles between three successive neutral lines within the template provides a compensate angle $\Delta\theta$, which is representative of the nature of specific distortion between two layers within the template and which should also exist within the used blade when reconstructed. The fact the changes in the angles between the three successive does not allow for the specific distortion in the angle between the two lower layers (relative to the next layer below those) does not, in fact, make any difference. Therefore, when determining the points on the neutral line in a new layer of the workpiece (L+2), the angle from the preceding layer (L+1) has two components: (i) the angle between the layer (L) preceding the preceding layer and the preceding layer (L+1), which is a result of original linear distortion within the blade and the new linear distortion due to use; and (ii) a compensate angle $\Delta\theta$, allowing for the inherent specific distortion between layers L and L+2, which is found in the template.

Figure 9:
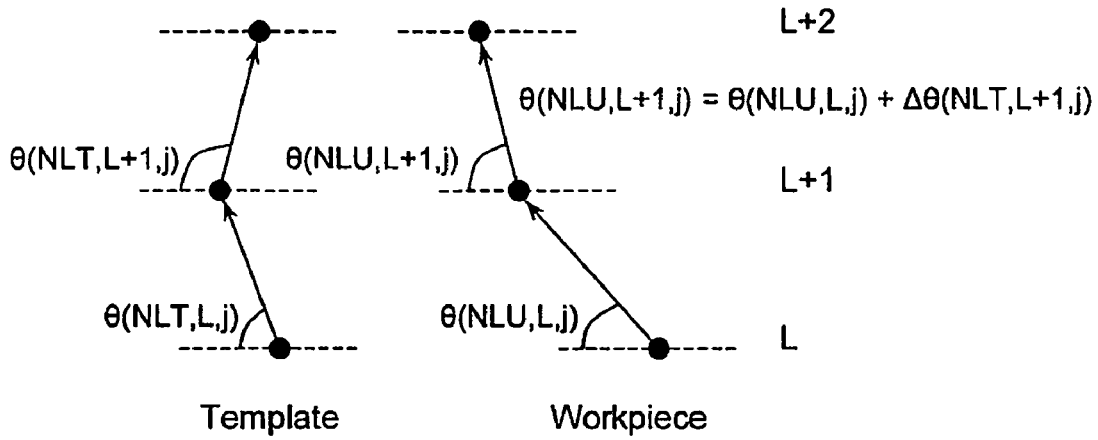
FIG. 9 is a diagram showing the derivation and use of compensate angles in determining the neutral line of a new layer.

The compensate angle $\Delta\theta$ is determined as shown in FIG. 9, which is a diagram showing the derivation and use of compensate angles in determining the neutral line of a new layer. On the template, the angle between any point j on one neutral line L and the corresponding point j on the next neutral line L+1 is "$\theta(NLT,L,j)$". The angle between the corresponding point j on the next neutral line L+1 and the corresponding point j on the next plus one neutral line L+2 is "$\theta(NLT,L+1,j)$". Thus the compensate angle $\Delta\theta$ for point j, from one neutral line L and the corresponding point j on the next but one neutral line L+2 is;

$$\Delta\theta(NLT,L+1,j)=\theta(NLT,L+1,j)-\theta(NLT,L,j).$$

The compensate angle $\Delta\theta(NLT,L+1,j)$ itself has three components $$\Delta\theta(NLT,L+1,j,x)=\theta(NLT,L+1,j,x)-\theta(NLT,L,j,x)$$

$$\Delta\theta(NLT,L+1,j,y)=\theta(NLT,L+1,j,y)-\theta(NLT,L,j,y)$$

$$\Delta\theta(NLT,L+1,j,z)=\theta(NLT,L+1,j,z)-\theta(NLT,L,j,z),$$

where these angles $\theta(\ldots,x)$, $\theta(\ldots,y)$ and $\theta(\ldots,z)$, represent the angle between the relevant axis (x, y or z) and the vector taking a point j from one neutral line to the next.

On the workpiece, the angle between the corresponding point j on the corresponding neutral line L and the corresponding point j on the next neutral line L+1 is "$\theta(NLU,L,j)$". The angle between the corresponding point j on the next neutral line L+1 and the corresponding point j on the next plus one neutral line L+2 is "$\theta(NLU,L+1,j)$", where $$\theta(NLU,L+1,j)=\theta(NLU,L,j)+\Delta\theta(NLT,L+1,j).$$

Therefore $$\theta(NLU,L+1,j)=\theta(NLU,L,j)+\theta(NLT,L+1,j)-\theta(NLT,L,j).$$

Since the neutral lines within the template for L, L+1 and L+2 and within the workpiece for L and L+1 are known, $\theta(NLU,L,j)$, $\theta(NLT,L+1,j)$ and $\theta(NLT,L,j)$ can be determined and $\theta(NLU,L+1,j)$ calculated.

A line starting at point j in the neutral line of layer L+1 in the workpiece, extending to the next layer (2 mm up in this case) at the angle $\theta(NLU,L+1,j)$ provides the position of the corresponding point j in the next layer of the workpiece, the layer being rebuilt.

In an alternative approach to determining the neutral line of the next layer of the workpiece, the offsets are vectors and the determination of the extrapolated neutral line of the upper layer U72 of the used workpiece is based on the view that, whilst the vector between two corresponding points on successive layers may be altered through use, the ratio of successive vectors within a distorted area should remain substantially the same. Thus $$VT70/VT68=VU70/VU68$$

for each x,y,z component of each member of each of those sets, i.e.

$$VT70A/VT68A=VU70A/VU68A \text{ (for each } x,y,z \text{ component)},$$

$$VT70B/VT68B=VU70B/VU68B \text{ (for each } x,y,z \text{ component)},$$

etc. In fact, for the z component, it is the same in every case, as the layers are selected as being a certain distance from the reference point, which distance is the same for corresponding layers of the template and used workpieces.

Given that the second and first sets of offsets (vectors) VT68 (VT68A, VT68B, . . . ) and VT70 (VT70A, VT70B, . . . ), respectively, for the template are known, as is a third set of offsets, the lower set of vectors VU68 (VU68A, VU68B, . . . ) for the used workpiece, it is then possible to calculate a fourth set of offsets, the upper set of vectors VU70 (VU70A, VU70B, . . . ) for the used workpiece. This, together with knowledge of the actual points of the neutral line NLU70 of the second layer of the used workpiece allow one to calculate the points for the neutral line NLU72 of the third layer of the used workpiece. Once those points are known, it is then possible to extrapolate for the next layer up in the used workpiece, in a similar manner, additionally using the details of the neutral line for the corresponding next layer up in the template.

This approach therefore allows a workpiece to be reconstructed, taking into account both the distortion and the original shape of the workpiece.

Once the neutral line for the third layer U72 of the used workpiece has been determined, it is possible to determine the neutral line for the next layer U74 of the used workpiece, based on the scanned layers T70, T72 and T74 of the template and U70 of the used workpiece and on the extrapolated layer U72, and so on.

Once the neutral line is calculated, it is also possible to determine the surface profile, again through extrapolation.

Figure 11:
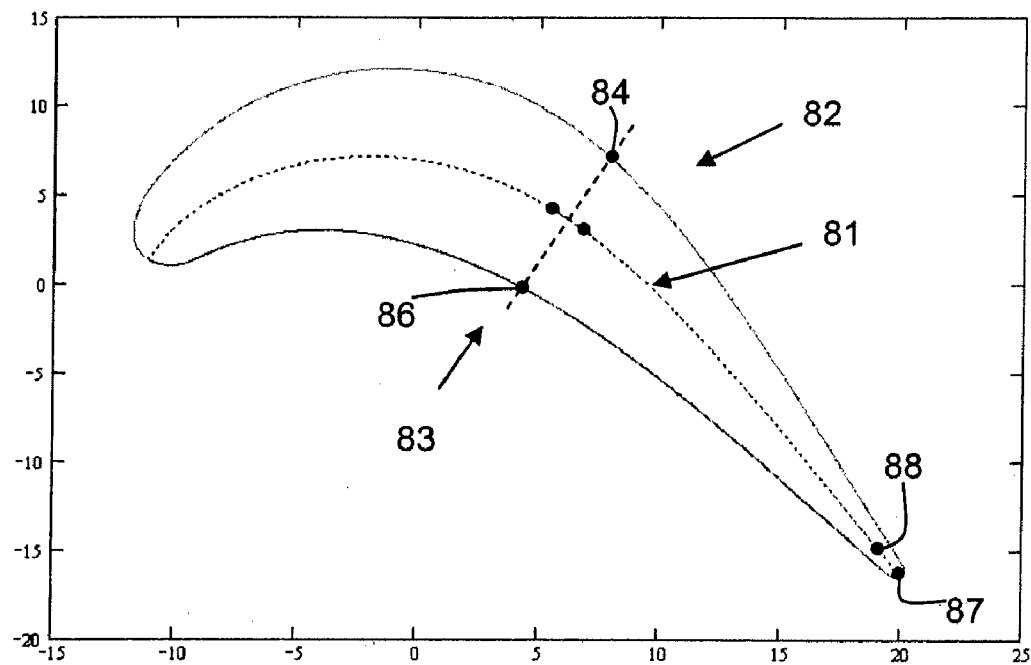
FIG. 11 shows a graph of the contours of a surface of a workpiece calculated from the determined neutral line in accordance with an embodiment of the invention.

Surface points are first determined for the two known layers of the used workpiece U68, U70, with one pair of surface points (one point on each surface), corresponding to each adjacent pair of neutral line points. FIG. 11 shows a neutral line 81 with corresponding surface points 84 on the convex side 82 and points 86 on the concave side 83.

On any neutral line, a first connecting line is formed between the first two points 87, 88 of the neutral line 81. A first perpendicular line is generated passing through the midpoint of the first connecting line. The perpendicular line intersects the workpiece profile, and the intersecting points, one on the convex and one on the concave side are recorded as the first pair of corresponding surface points. A second connecting line extends between the second and third points of the neutral line 81. A second perpendicular line passing through the mid-point of the second connecting line intersects the workpiece profile at the second pair of corresponding surface points. This is repeated for all points of the modified neutral line. In this embodiment, there are 100 points on the neutral line, leading to a total of 198 corresponding surface points, in addition to the two end points to represent the turbine contour.

For each layer, a length is determined for each of the calculated perpendicular lines, from where the perpendicular line crosses its respective connecting line, to where the perpendicular line intersects the workpiece profile. Each layer has a set of these, LU68 (LPU68A, LSU68A, LPU68B, LSU68B, LPU68C, LSU68C, . . . ) and LU70 (LPU70A, LSU70A, LPU70B, LSU70B, LPU70C, LSU70C, . . . ) for the used workpiece. In this case, LP means the length of the perpendicular line to the convex (pressure) surface, while LS means the length of the perpendicular line to the concave (suction) surface.

Once the neutral line for the third layer U72 of the used workpiece is determined, the sets of known lengths for the other layers of the used workpiece are used to extrapolate the surface points of the third layer U72. The determination of the extrapolated surface points of the upper layer U72 of the used workpiece is based on the view that, whilst the lengths from the neutral line to the surface for two corresponding points on successive layers may be altered through use, the ratio of successive lengths within a distorted area should remain substantially the same.

Thus:

$$(LU72-LU70)/(LU70-LU68)=[\text{distance}(U72-U70)]/[\text{distance}(U70-U68)],$$

where "distance (U72–U70)", means the distance between the two layers, which in this case is the height difference 2 mm. As the layers are all the same distance apart, this leads to $$(LU72-LU70)=(LU70-LU68)$$

Since LU68 and LU70 are known, it is possible to determine LU72. The profile is then built up using the neutral line for U72 and the set of lengths LU72.

Alternatively, this process can also use data from the profiles of the template layers. This again allows the process to take account of general changes as well as specific changes between layers.

For this purpose, surface points are also determined for the three layers of the template T68, T70, T72. These are used to determine a set of perpendicular lines for each layer: LT68 (LPT68A, LST68A, LPT68B, LST68B, LPT68C, LST68C, . . . ), LT70 (LPT70A, LST70A, LPT70B, LST70B, LPT70C, LST70C, . . . ) and LT72 (LPT72A, LST72A, LPT72B, LST72B, LPT72C, LST72C, . . . ) for the template.

The relevant ratio that is then used to determine the surface points on the new layer of the workpiece, U72 is $$(LU72-LU70)/(LU70-LU68)=(LT72-LT70)/(LT70-LT68)$$

for each component. i.e.

$$(LPU72A-LPU70A)/(LPU70A-LPU68A)=(LPT72A-LPT70A)/(LPT70A-LPT68A),$$

$$(LSU72A-LSU70A)/(LSU70A-LSU68A)=(LST72A-LST70A)/(LST70A-LST68A),$$

$$(LPU72B-LPU70B)/(LPU70B-LPU68B)=(LPT72B-LPT70B)/(LPT70B-LPT68B),$$

$$(LSU72B-LSU70B)/(LSU70B-LSU68B)=(LST72B-LST70B)/(LST70B-LST68B),$$

etc.

Since all the terms except for those related to LU72 are known, it is possible to calculate the line set LU72. The profile is then built up using the neutral line for U72 and the set of lengths LU72.

Once the neutral line and surface points have been defined for one layer, they can be determined for the next layer, until as many layers as are needed are built up. Once surface points have been determined for as many layers as are necessary for the used workpiece, further points can be interpolated on the surfaces of those workpieces and between adjacent layers as and if necessary.

In the above described embodiment, a first set of offsets is calculated between the shape data of the first and second portions of the template. Further, two more sets of offsets are determined, one within the first portion of the template and another within the first portion of the workpiece. Ratios of the various offsets, together with shape data of the first portion of the workpiece is used to determine shape data of the second portion of the workpiece.

In an alternative embodiment, only one offset is needed, the offset between the first and second portions of the template. This could be added directly to the shape data of the first portion of the workpiece to determine shape data of the second portion of the workpiece. However, this would not be as accurate.

[In another alternative embodiment, the first set of offsets is calculated between the shape data of the first portion of the template and the shape data of the first portion of the workpiece (more particularly between the layers U70 and T70). Then the shape data of the second portion of the workpiece may be determined using this different first set of offsets and the shape data of the second portion of the template (layer T72). Again, however, this would be less accurate.

A better alternative would again be to calculate a two sets of offsets between the shape data of the first portion of the template and the shape data of the first portion of the workpiece (one set between corresponding layers T70 and U70 and the second set between T68 and U68). These would then be used to calculate a third offset between the second portions of the template and workpiece (more particularly layers T72 and U72) on the basis of a relevant ratio, for instance that the ratio of the third offset to the second offset is the same as the ratio of the second offset to the first offset.]

It should be noted that neither of the above approaches requires data from the lower layers of the template. It only requires data from the layers corresponding to the damaged layers of the used workpiece and two layers below that. On the other hand, whilst the above approaches use data on successive layers, it is possible to use data on layers which are 2 or more layers apart, or some data on layers one distance apart and other data on layers a different distance apart, preferably as long as it is the same for both the template and workpiece. For example, one may use data on layers T66, T70 and T72, but should also use data on layers U66 and U70 to determine U72. T is possible to use different sets of layers but requires extra interpolation.

Figure 12:
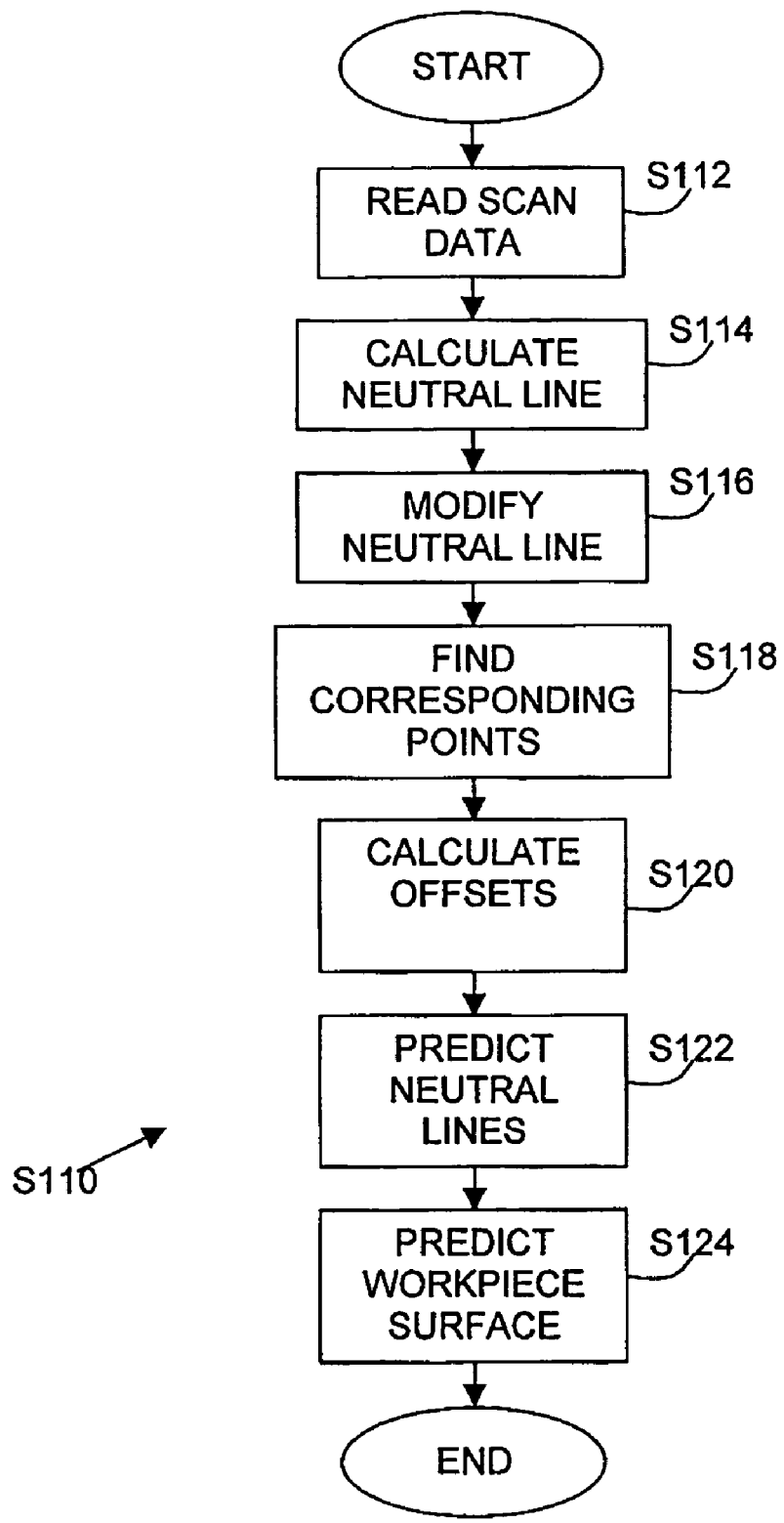
FIG. 12 shows a flow chart of a method in accordance with an embodiment of the invention.

FIG. 12 shows a process S110 of an embodiment of the invention for determining profile points for damaged or broken off layers of the used workpiece. The profile data is read (step S112) from the device such as CMM, and modified accordingly, if necessary. For example additional points are inserted, data is separated into sections such as the convex or concave sections of the workpiece etc. Neutral lines are calculated (step S114) from selected points. For example in an embodiment, 44 points may be selected at the tail end of the workpiece to represent the curve at level T68 as shown in FIG. 8, which may produce an error of less than 25 microns. The neutral line may be modified (step S116) accordingly. Once the neutral lines are calculated for the used and unused workpieces, the corresponding points are calculated (step S118) for the contour of the surface of the two layers of the refurbished workpiece. Sets of offsets are calculated (step S120) to reflect the distortion of the used workpiece, and the predicted neutral lines of the succeeding layers are calculated accordingly (step S122), followed by calculating the predicted surface profile itself (step S124).

Once the surface profile has been calculated, or predicted, it is then possible to add the new material (if it was not added previously) and finish the surface according to the predicted profile. This can, for instance, be done by way of a polishing machine controlled according to the generated complex curve.

Although, ideally, the reference template is an unused copy of the same workpiece, that is not essential. It could be a used copy, which has not been damaged. If it has been subjected to the same use as the damaged workpiece, then there may even be advantages to it, as extrapolation then may be more accurate.

The embodiment discussed herewith may generally be implemented in and/or on computer architecture that is well known in the art. The functionality of the embodiments of the invention described may be implemented in either hardware or software. In the software sense components, of the system may be a process, program or portion thereof, that usually performs a particular function or related functions. In the hardware sense, a component is a functional hardware unit designed for use with other components. For example, a component may be implemented using discrete electrical components, or may form a portion of an entire electronic circuit such as an Application Specific Integrated Circuit (ASIC). There are numerous other possibilities that exist, and those skilled in the art would be able to appreciate that the system may also be implemented as a combination of hardware and software components.

Personal computers or servers are examples of computer architectures that embodiments may be implemented in or on. Such computer architectures comprise components and/or modules such as central processing units (CPU) with microprocessor, random access memory (RAM), read only memory (ROM) for temporary and permanent, respectively, storage of information, and mass storage device such as hard drive, diskette, or CD ROM and the like. Such computer architectures further contain a bus to interconnect the components and a controlled information and communication between the components. Additionally, user input and output interfaces are usually provided, such as a keyboard, mouse, microphone and the like for user input, and display, printer, speakers and the like for output. Generally, each of the input/output interfaces is connected to the bus by the controller and implemented with controller software. Of course, it will be apparent that any number of input/output devices may be implemented in such systems. The computer system is typically controlled and managed by operating system software resident on the CPU. There are a number of operating systems that are commonly available and well known. Thus, embodiments of the present invention may be implemented in and/or on such computer architectures.

Figure 13:
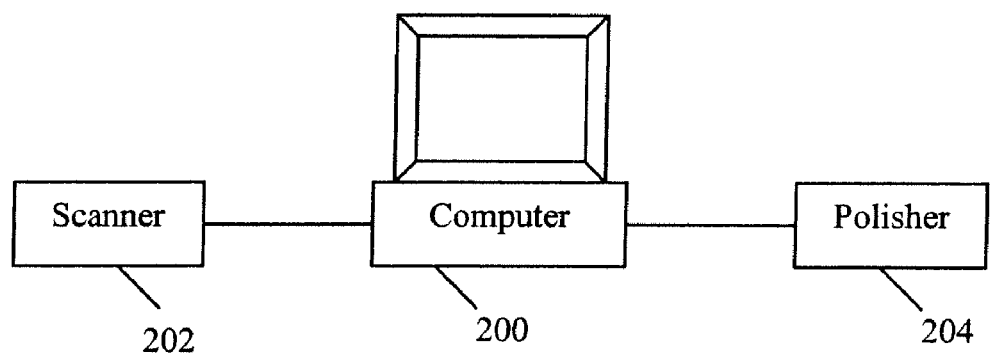
FIG. 13 shows apparatus in the form of a computer system according to an embodiment of the invention.

FIG. 13 shows apparatus in the form of a computer system for carrying out aspects of the above-described embodiments. A computer 200 is connected to a scanner 202 for scanning a template and the workpiece to be repaired. The computer includes a memory and processor (not shown) for receiving and storing scanned data (whether from the indicated scanner 202 or from some other source) and generating the relevant complex curve data. A polishing machine 204 is also connected to the computer 200 for polishing the workpiece, once repaired, to give it a surface with the generated complex curve.

The invention is particularly applicable to bodies with aerofoil shaped sections, whether as turbine blades for turbines (for instance in aerospace applications) or compressors (for instance in ship or aerospace applications), or as other bodies. Although the exemplified embodiments of the invention relate to a curved body, in particular one with a complex curve, specifically bodies with an aerofoil shaped section, the invention is not limited thereto. The invention can be used to reconstruct the profile of other shapes, curved or non-curved, complex or non-complex, with component processes adjusted accordingly, if necessary.

Further, whilst the invention has been embodied in being used in repairing a body, it can be used to determine a shape to add to a body, even where that shape never previously existed.

It will be appreciated that while only a few specific embodiments of the invention have been described herein for the purposes of illustration, various changes or modifications may be made without departing from the scope of the invention.

What is claimed is:

1. A method for determining shape data for a blade, to effect a repair of the blade, the blade comprising at least a first portion and the shape data to be determined for a damaged portion of the blade, the method comprising:
providing shape data of the first portion of the blade;
providing shape data of a first template portion and a second template portion of a reference template, the first template portion corresponding to the first portion of the blade, and the second template portion corresponding to the damaged portion of the blade, the second template portion having a shape related to the shape to be determined for the damaged portion of the blade;
calculating a first set of offsets, between the shape data of the first and second template portions of the reference template;
calculating a second set of offsets, within the shape data of the first portion of the reference template, and a third set of offsets, within the shape data of the first portion of the blade; and
using the second and third sets of offsets, together with the first set of offsets and the shape data of the first portion of the blade to determine the shape data of the damaged portion of the blade.

2. A method as claimed in claim 1, further comprising generating surface shape data for the damaged portion of the blade based on the determined shape data of the damaged portion of the blade.

3. A method as claimed in claim 1, further comprising using the first, second and third sets of offsets to determine a fourth set of offsets representing the offsets between the shape data of the first and damaged portions of the blade.

4. A method as claimed in claim 3, wherein the first, second and third sets of offsets are sets of angles and the fourth set of offsets is generated based on the difference between corresponding angles within the first and second sets of offsets being added to the corresponding angles of the third set of offsets.

5. A method as claimed in claim 3, wherein the fourth set of offsets is generated based on the ratio between corresponding offsets within the first and second sets of offsets being the same as that between corresponding offsets between the third and fourth sets of offsets.

6. A method as claimed in claim 1, wherein the shape data of the blade and reference template comprise shape data on layers of the blade and reference template.

7. A method as claimed in claim 6, wherein the shape data on layers of the blade and reference template are obtained by scanning the first portion of the blade and the first and second portions of the reference template in layers.

8. A method as claimed in claim 6, wherein the first, second and third sets of offsets each comprise sets of offsets between corresponding points within series of layers within the blade and template.

9. A method as claimed in claim 1, wherein the blade is a turbine blade.

10. A method as claimed in claim 1, wherein the blade is a deformed version of the reference template.

11. A method as claimed in claim 1, wherein the blade has a surface with a complex curve and the shape data on the damaged portion of the blade comprises data on said complex curve.

12. A method as claimed in claim 1, wherein the damaged portion of the blade comprises a missing portion of the blade.

13. A method for determining shape data for a blade, to effect a repair of the blade, the blade comprising at least a first portion and the shape data to be determined for a damaged portion of the blade, the method comprising:
providing shape data of the first portion of the blade;
calculating a neutral line of the first portion of the blade based on the shape data;
providing shape data of a first template portion and a second template portion of a reference template, the first template portion corresponding to the first portion of the blade, and the second template portion corresponding to the damaged portion of the blade;
calculating a neutral line of each of the first and second portions of the reference template based on the shape data;
determining a neutral line of the damaged portion of the blade, based on the neutral lines of the first and second portions of the reference template and of the first portion of the blade; and
determining the positions of points on the surface of the damaged portion of the blade, based on the neutral line of the damaged portion of the blade and points on the surfaces of the first portion of the blade.

14. A method as claimed in claim 13, wherein determining the positions of points on the surface of the damaged portion of the blade is further based on points on the surfaces of the first and second portions of the reference template.

15. A method as claimed in claim 13, wherein the points on the surface of the damaged portion of the blade correspond to selected points on the neutral line of the damaged portion of the blade, the method further comprising;
for each selected point on the neutral line of the damaged portion of the blade, determining the position of the corresponding point on the surface of the damaged portion of the blade based on ratios of distances from the neutral line and the surface for corresponding neutral line points in the first portion of the blade.

16. A method as claimed in claim 13, wherein the blade is a turbine blade.

17. A method as claimed in claim 13, wherein the blade is a deformed version of the reference template.

18. A method as claimed in claim 13, wherein the blade has a surface with a complex curve and the shape data on the damaged portion of the blade comprises data on said complex curve.

* * * * *